United States Patent [19]
Roche

[11] 3,942,269
[45] *Mar. 9, 1976

[54] AUDIO-VISUAL SYSTEM INCLUDING AUDIO-VISUAL SLIDES

[75] Inventor: John L. Roche, St. Paul, Minn.

[73] Assignee: Minnesota Mining and Manufacturing Co., St. Paul, Minn.

[ * ] Notice: The portion of the term of this patent subsequent to Mar. 13, 1990, has been disclaimed.

[22] Filed: May 22, 1972

[21] Appl. No.: 255,450

Related U.S. Application Data

[63] Continuation-in-part of Ser. No. 114,834, Feb. 12, 1971, Pat. No. 3,720,005.

[52] U.S. Cl. .................................. 35/9 A; 353/19
[51] Int. Cl.² ......................................... G09B 7/08
[58] Field of Search .......... 35/9 A, 8 A; 353/18, 19

[56] References Cited
UNITED STATES PATENTS

| | | | |
|---|---|---|---|
| 3,122,054 | 2/1964 | Dimitracopoulos | 353/18 |
| 3,353,280 | 11/1967 | Emde | 35/9 A |
| 3,383,781 | 5/1968 | Diuzet | 35/9 A |
| 3,471,942 | 10/1969 | Weitzman | 35/9 A |
| 3,497,966 | 3/1970 | Gaven | 35/9 A |
| 3,501,851 | 3/1970 | Price | 35/9 A |
| 3,541,699 | 11/1970 | Baker | 35/9 A |
| 3,608,208 | 9/1971 | Willardson | 35/9 A |

*Primary Examiner*—Wm. H. Grieb
*Attorney, Agent, or Firm*—Alexander, Sell, Steldt & DeLaHunt

[57] ABSTRACT

An audio-visual system for providing correlated audio and visual presentations from audio-visual slides in a sequence corresponding to a branched learning format. Upon an operator selecting a presented response choice, a projected program containing first indicia providing a binary number indicating the number of steps and second indicia indicating the direction which the slide magazine should be stepped to be in position for presenting the next slide, is sensed and the binary number is stored in a register. The magazine is stepped in the indicated direction; and the number of steps taken are counted and compared to the binary number stored in the register. When the compared counts are equal, the stepping of the magazine is stopped.

17 Claims, 5 Drawing Figures

AUDIO-VISUAL SYSTEM INCLUDING AUDIO-VISUAL SLIDES

CROSS-REFERENCE TO RELATED APPLICATION

This application is a continuation-in-part of my copending application Serial No. 114,834, filed February 12, 1971, now U.S. Pat. No. 3,720,005 issued Mar. 13, 1973.

BACKGROUND OF THE INVENTION

1. Field of the Invention

The present invention pertains to an audio-visual system for presenting correlated recorded audio and visual information from an audio-visual slide and is particularly directed to the type of audio-visual system which is useful in an educational system for providing a plurality of correlated audio and visual presentations in a sequence corresponding to a branched learning format.

2. Description of the Prior Art

The present invention is directed to an improvement in an audio-visual system wherein a plurality of audio-visual slides having correlated recorded audio and visual information and being removably located in a magazine, are transported by positioning means within an audio-visual slide apparatus to present a given one of the audio-visual slides for providing correlated reproduced audio and projected visual information from the presented audio-visual slide. The positioning means include bidirectional stepping means for bidirectionally stepping the magazine. Such a system is described in U.S. Pat. No. 3,122,054 to Dimitracopoulos et al.

Certain of the elements of the system of the present invention are set forth in various other U.S. Pat. Nos. The provision of the capability of reacting to operator response choices to branch or alter the display of correlated audio and visual information in accordance with a predetermined format is disclosed in U.S. Pat. No. 3,501,851 to Price et al. The inclusion of predetermined program indicia on a visual record is disclosed in U.S. Pat. No. 3,471,942 to Weitzman. The inclusion of three sections in a recorded visual display area (1) for providing the visual display information, (2) for providing a plurality of predetermined operator response choices related to the visual display information, and (3) for providing predetermined program indicia for controlling the operation of the audio-visual system in accordance with the particular operator selected predetermined response choice, is disclosed in U.S. Pat. No. 3,497,966 to Gaven.

Each of the above elements contributes certain advantages in the versatility and the capacity of an audio-visual system, these advantages being discussed in the various patents cited. None of these patents, however, suggests a system combinig all of these features nor do they suggest how all of these features might be combined.

SUMMARY OF THE INVENTION

I have applied certain of the features set forth in my above cross-referenced copending application to an audio-visual slide system in order to provide an improved audio-visual system for presenting correlated audio and visual information in a sequence corresponding to a branched learning format.

Accordingly, the audio-visual slides are located in a sequence corresponding to a branched learning format; and each slide contains a given number of predetermined response choices related to the correlated audio and visual information, and a given number of projectable predetermined programs. Each program individually relates a response choice to a predetermined audio-visual slide having a predetermined location in the sequence.

The audio-visual slide apparatus includes selection means for enabling an operator to select one of the given number of predetermined response choices, projection means for projecting the given number of predetermined programs from the audio-visual slide, sensing means responsive to the operation of the selection means for sensing the one of the projected predetermined programs which is related to the selected response choice, and control means which are responsive to the operation of the selection means for controlling the positioning means in accordance with the sensed predetermined program in order to present the predetermined audio-visual slide related to the selected predetermined response choice.

Thus, the system of the present invention will allow easy and quick generation of a branched learning format. It allows demonstration and proof of the learning format effectiveness. It allows modification and rearrangement of the learning format content and is usable in virtually any training or educational context.

Various features of the present invention are next set forth in this summary, with reference to certain preferred embodiments in which these features are incorporated.

Each of the projectable predetermined programs of a given slide includes first indicia providing a binary number for indicating the number of audio-visual slides in the sequence that the predetermined audio-visual slide related to the predetermined response choice by the program is located in the sequence from the given audio-visual slide.

Accordingly, the positioning means includes a stepping means for incrementally stepping the magazine a number of steps corresponding to the number of audio-visual slides in the sequence that the predetermined audio-visual slide is located in the sequence from the presented given audio-visual slide.

Also, the control means include counting means for counting the number of steps stepped by the stepping means; and a registering and gating means for registering the binary number provided by the first indicia of the sensed predetermined program, and for enabling the stepping means to repetitively incrementally step until the number of steps counted by the counting means equals the registered binary number.

Each of the projectable predetermined programs of a given audio-visual slide further includes second indicia for indicating the direction in the sequence of audio-visual slides that the predetermined audio-visual slide related to the predetermined response choice by the program is located in the sequence from the given audio-visual slide. Accordingly, the bidirectional stepping means are responsive to the sensed second indicia for stepping the magazine. To accomplish this, the control means further include a direction setting switching means for setting the stepping means in accordance with the second indicia of the sensed predetermined program to step the magazine in either a forward or a reverse direction corresponding to forward and reverse directions in the sequence of audio-visual slides.

Additionally, the control means including means for causing the audio information from a presented audio-visual slide to be repeated when the sensed first indicia indicate that the stepping means should step zero steps in one given direction. When a "zero-steps" indication for the other given direction is sensed, an accessory device, such as a movie projector, is actuated.

Each of the visual display areas includes a discrete section containing a given number of projectable predetermined response choices related to do the information recorded on the audio-visual slide. Accordingly, the audio-visual slide apparatus further comprises a shutter supported either for blocking the projection of an image of the response choices or for enabling the projection of an image of the response choices.

In the preferred embodiment, each of a plurality of groups of adjacent audio-visual slides contains related information, with one audio-visual slide in each group being the sequentially first audio-visual slide for that group. Either the location of such first audio-visual slides in the magazine, or the individual first slides themselves each include sensible means for indicating that such audio-visual slide is a first audio-visual slide. Accordingly, the audio-visual slide apparatus further comprises an operator-actuatable first audio-visual slide accessing means for causing the positioning means to reposition the magazine until a first audio-visual slide is detected in such position as to be removed from the magazine and presented for providing audio and visual information therefrom. These accessing means include detector switching means positioned for detecting the sensible means, and an access switching means enabled by the detector switching means for causing the positioning means to stop repositioning the magazine when a sequentially first audio-visual slide is detected at such position. This embodiment thus provides a main branch programming feature. If the operator has become confused or does not understand the train-of-thought in the sequence of audio-visual slides he has just seen, and thereby becomes lost in the learning program, he may return to the sequentially first audio-visual slide in a related group by actuating this first audio-visual slide accessing means, such as by depressing a "go back" switch.

The present invention also encompasses a set of audio-visual slides according to the various above-described embodiments, which slides are designated for location in a sequence corresponding to a branched learning format.

The present invention further encompasses the audio-visual slide apparatus according to the various above described embodiments.

DESCRIPTION OF THE PREFERRED EMBODIMENT

Figure 1:
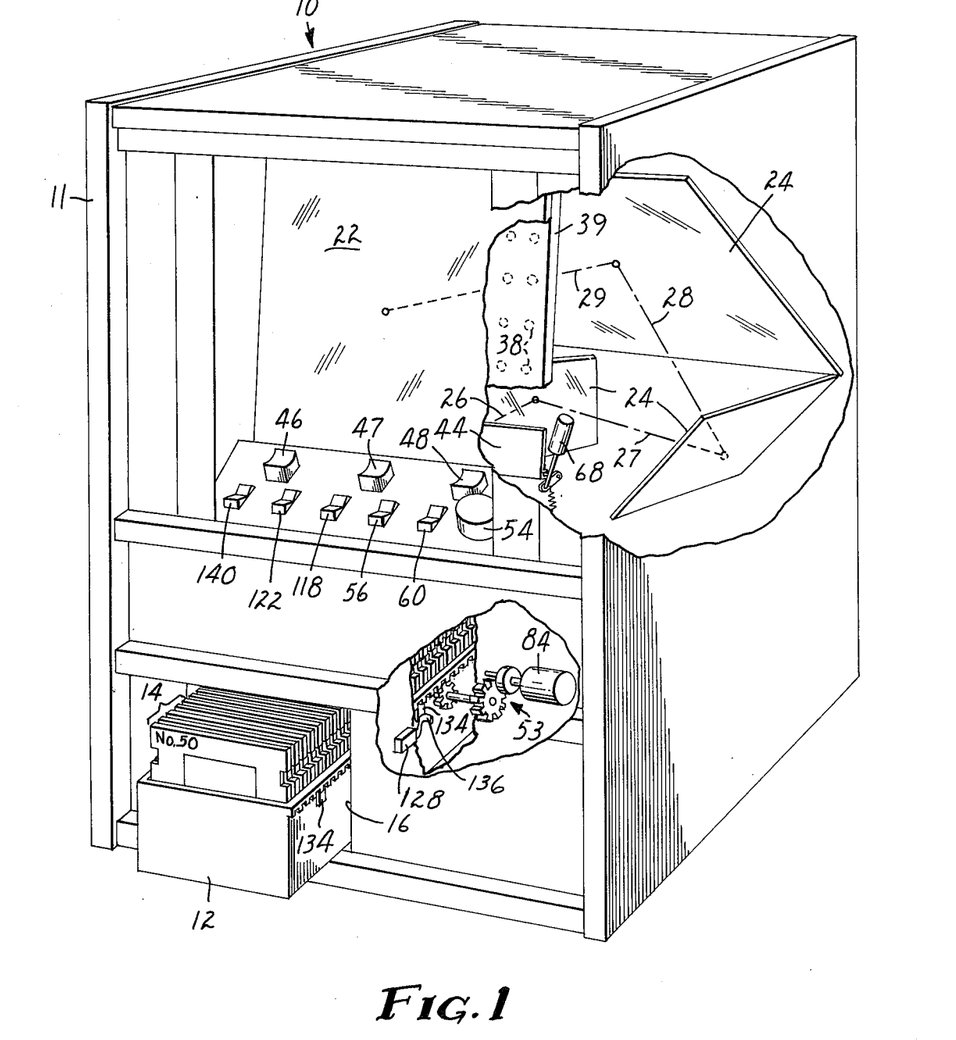
FIG. 1 is a perspective view of an audio-visual system according to the present invention, with portions of the audio-visual slide apparatus console cover broken away to show certain interior elements.

Referring to FIG. 1, the audio-visual slide apparatus 10 includes a standard audio-visual slide unit (hidden from view by the outer portions of the console 11) such as that described in the above cited U.S. Pat. No. 3,122,054, the disclosure of which is incorporated herein by reference. The preferred audio-visual slide unit is the 3M Brand Sound-on-Slide System available from Minnesota Mining and Manufacturing Company, St. Paul, Minnesota, U.S.A.

Throughout the course of this description, several of the elements which are discussed are indicated as "not shown". All of these elements are included in the preferred standard audio-visual slide unit indicated above; and their construction and operation within such apparatus are known to those skilled in the art.

Figure 2:
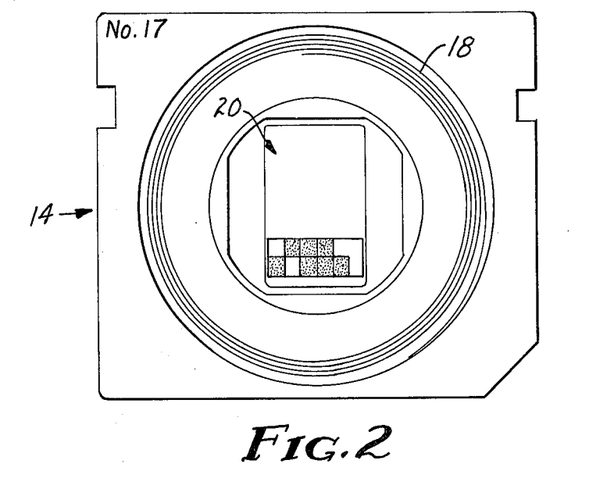
FIG. 2 is a plan view of an audio-visual slide according to the present invention with the side of the slide which is shown being the opposite of the side of such a slide which is partially shown in FIG. 1.

A magazine or tray 12 containing fifty audio-visual slides 14 is inserted into the opening 16. Each slide 14 (FIG. 2) includes a sound track 18 and a visual portion 20. Each sound track 18 contains up to about 30 seconds of audio recording.

The apparatus 10 contains a projection lens (not shown), a lamp (not shown), a 7½ inch by 7½ inch (19 cm × 19 cm) rear projection viewing screen 22, and a system of mirrors 24 for enabling the display of the visual information when a slide 14 is moved up and out of the tray into a presentation position. The projected image follows a path indicated by the dashed lines 26-27-28-29 from the presented slide (not shown) to the screen.

Figure 3:
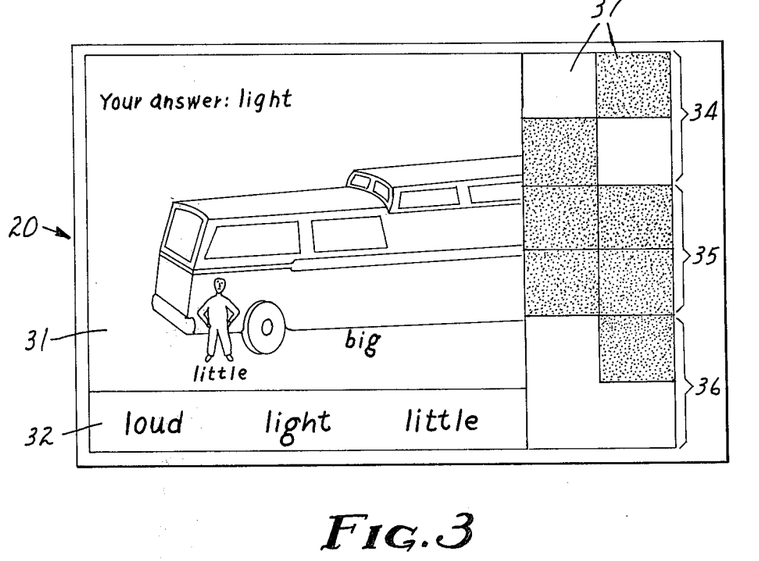
FIG. 3 is a plan view showing the detail of the visual portion of the slide of FIG. 2, but facing in an opposite direction from that shown in FIG. 2.

The visual portion 20 (FIG. 3) of a slide 14 includes a visual information section 31; a discrete section 32 which contains three predetermined response choices; and three predetermined programs, each program being a set 34, 35, 36 of four code blocks 37. The code blocks 37 are either opaque or transparent and thus either enable or inhibit the transmission of light to individual photosensors 38 in an array 39 contained within the apparatus 10. Within each code block set 34, 35, 36, the upper left-hand code block is the second indicium indicating the direction of movement of the slide tray 12; and the remaining three code blocks (which are the first indicia) provide a binary number indicating the number of steps which the tray 12 is to move. The provision of three first indicia code blocks thus enables the tray 12 to be stepped up to seven positions in either direction, as will be described in more detail in connection with the description of FIGS. 4A and 4B below. Further description of the use of this coding scheme to prepare a plurality of correlated audio-visual media in a branched learning format is set forth in my above cross-referenced copending application and is incorporated herein by reference.

To generally describe the use of the present audio-visual system by an operator, when a slide 14 is moved up for presentation, only the image in the information section 31 is initially displayed on the screen 22. Simultaneously, the recorded audio information is reproduced from the sound track 18 and provided from a speaker 42 (FIG. 4A) or from earphones (not shown).

After the recorded audio information is fully reproduced a reveal shutter 44 drops down to enable the image of the discrete section 32 containing the response choices to be displayed on the screen 22. The operator may then depress one of the three response switches 46, 47, 48, to make his selection in response to the presented information. These three switches 46, 47, 48, are positioned to correspond to the positions of the three presented response choices shown in the discrete section 32. The operation of one of the response switches 46, 47 or 48, enables the image of the corresponding code block set 34, 35 or 36 which is imaged on the photosensors 38 to be sensed on the lines 49, 50, 51 and 52 within the control means which are generally embodied in the electrical circuit of FIGS. 4A and 4B.

In response to the sensing of the corresponding code block set 34, 35, 36, the tray 12 is stepped by the stepping mechanism 53 to the indicated position so that the next slide 14 may be presented.

A more detailed description of the operation of the system follows.

By turning the "on-off-volume" knob 54 to the "on" position, electrical power is provided for operating the system. The tray 12 is inserted into the apparatus 10. A momentary action "start" switch 56 is then closed to energize slide positioning relay coil 58. When the relay coil 58 is energized, power is provided to a positioning motor (not shown) in the audio-visual apparatus 10, which positioning motor operates to move a slide 14 either up into position for presentation during one half cycle of motor operation, or down back into the tray 12 during the next half cycle of positioning motor operation. Upon each energization of the relay coil 58, the positioning motor completes one-half of operation.

As the slide 14 is raised, shutter leaves (not shown) in the audio-visual apparatus 10 open and a projection lamp (not shown) is turned on. A switch 60 on the console 11 may be operated to move the projection lens (not shown) to focus the image projected on the screen 22.

Upon the slide 14 being raised, in response to the energization of the relay coil 58, mechanical means coupled to the slide lifting mechanism (not shown) operate to lower a reproducing head (not shown) into contact with the sound track 18, whereupon the recorded audio is reproduced and provided at the speaker 42. A 60 Hz tone is recorded at the end of the audio message for indicating the end of the audio message. When this 60 Hz tone is detected by the audio amplifier (not shown) a signal is provided to gate an SCR 62 into conduction. This SCR 62 is included within the preferred standard audio-visual slide unit.

Upon the SCR 62 being turned on, a relay coil 64 is energized thereby moving the switch 65 out of contact with the speaker 42 and into contact with the response switches 46a, 47a and 48a; thereby closing shutter switch 66; and also thereby closing switch 67 for enabling the relay coil 58 to be energized when a choice switch 46, 47 or 48 is closed.

The speaker 42 is thus inhibited so as not to provide the 60 Hz tone to the operator. Also, the response choice switches 48a, 47a, 48a are thus connected to ground thereby enabling them. When the shutter switch 66 is closed, a solenoid coil 68 is energized thereby causing the reveal shutter 44, which is mechanically coupled thereto, to be lowered to reveal the image of the response choices contained in the discrete section 32 of a slide 14.

The operator may then operate one of the response choice switches 46, 47, 48. Since all three switches operate in the same manner, only the operation of the switch 46 will be discussed. When the switch 46 is depressed, switches 46a and 46b are closed, thereby enabling the image of the code block set 34 received by the phototransistors 70, 71, 72 and 73 to be sensed on the lines 49, 50, 51 and 52 so that the binary number provided by the first indicia code blocks is registered in the flip-flops 75, 76 and 77 of counter 78 and the direction indication represented by the second indicia code block is registered in the direction indicating flip-flop 79. The closure of the switch 46b causes the slide positioning relay coil 58 to be energized for moving the slide 14 down into the tray 12. The movement of the slide positioning mechanism (not shown) in lowering the slide 14, also causes the reproducing head to be raised from the sound track 18, turns off the projection lamp, and closes the shutter leaves.

When the reproducing head is raised, the head raising mechanism (not shown) causes a switch 81 connected in series with the SCR 62 to be opened thereby turning off the SCR 62. The switch 81 is closed when the head is again lowered. When the SCR 62 is turned off, the relay coil 64 is deenergized, thus causing switches 65 and 66 to be returned to their former positions; whereby the speaker 42 is again enabled and the reveal shutter solenoid coil 68 is deenergized to cause the reveal shutter 44 to be raised to an image blocking position. Response choice switches 46a, 47a and 48a are also disconnected from ground thereby preventing the count which has been registered in the counter 78 and the direction indicating which has been registered in the flip-flop 79 from being changed.

When the slide positioning mechanism completes the downward movement of the slide into the tray 12, a stepping motor enabling switch 83 is closed, thereby enabling the DC stepping motor 84 to operate the stepping mechanism 53 (FIG. 1) to move the tray 12. The stepping motor 84 is further enabled by the closure of reed relay switch 86 in response to the energization of reed relay coil 88. Relay coil 88 is energized only when the output signal on line 90 from comparison circuit 92 indicates a disparity between the binary number registered in the counter 78 and the count registered in the counter 93 comprising the set of flip-flops 94, 95, 96. The count in the counter 93 is indicative of the number of locations which the tray 12 has been stepped. This count is provided to the counter 93 on the line 98 in response to each closure of the switch 100. The switch 100 is coupled to the stepping mechanism 53 and is closed each time the tray 12 is stepped one location. Thus, once the switch 83 is closed, the stepping motor 84 operates to step the tray 12 until the tray 12 has been stepped the number of locations indicated by the sensed set of first indicia code blocks.

The direction in which the tray 12 is stepped is determined by the position of reed relay switch 102, which is shown in the "reverse" direction position. The position of the switch 102 is controlled by the energization of reed relay coil 104, which is energized in response to the signal received on line 106 from the flip-flop 79. When an opaque code block is sensed by the flip-flop 79, the reverse direction is indicated.

When the signal on the line 90 indicates parity between the compared counts relay coil 88 is deenergized, thereby opening the switch 86 and stopping the motor 84. Such a parity indicating output signal as appears on the line 90 also is transmitted on line 108 to again energize the slide positioning relay coil 58. Upon energization of the relay coil 58, a slide 14 is again moved up into position for presentation. When the slide 14 is moved up, switch 110 is momentarily opened thereby providing a signal on line 112 to reset all of the flip-flops 75, 76, 77, 79, 94, 95 and 96. The presentation and response cycle discussed above is then repeated.

There are two exceptions to the sequence described above. These occur when the sensed first indicia code blocks are all opaque, thus indicating that the tray should be stepped "zero" steps. When such occurs, the signal on line 90 indicates parity; and the stepping motor 84 is therefore not enabled. Also, the parity indicating signal on the line 108 causes the slide positioning relay coil 58 to be reenergized to cause the same slide 14 to be repositioned and the audio and visual information recorded thereon to be repeated. The second exception occurs when only the sensed direction indicating code block is transparent. Instead of, or in addition to, the same slide 14 being repositioned as discussed above, a signal is provided on line 114 to actuate an accessory device 116, such as a movie projector. When such occurs, means (not shown) may also be provided for turning off the slide apparatus 10 and to thereby inhibit the representation of the same slide 14.

Instead of depressing one of the response selection switches 46, 47, 48 at such time as the audio presentation has been completed, and the reveal shutter 44 lowered to reveal the response choices, the operator may wish to have the audio message repeated. To do so, the operator may depress a momentary contact repeat switch 118 to close the same and thereby energize solenoid coil 120. When the solenoid coil 120 is energized, mechanical linkage (not shown) coupled thereto raises the reproducing head from the sound track 18 and allows the head to be repositioned to the outside of the sound track 18. In response to the raising of the head, the switch 81 is opened, the reveal shutter 44 is again closed, and the speaker 42 is again enabled. When the switch 118 is opened, the solenoid coil 120 is deenergized and the head is lowered to the outside of the sound track 18, whereby the audio information is repeated.

In order to position the slide tray 12 so that a sequentially first slide 14 of a related group of slides 14 can be presented, the operator may depress and thereby close momentary contact switch 122. When the switch 122 is closed, a signal pulse is provided on the line 124 to actuate the slide positioning relay coil 58 and thereby lower the slide 14 into the tray 12; flip-flop 125 is set, thereby causing a signal pulse to be delivered on line 126 to reset the flip-flops 75, 76, 77, 79, 94, 95 and 96; and a signal is delivered through detector switch 128 to access switching circuit 130 to provide an enabling voltage on line 132 to the motor 84. Also, when the switch 122 is closed, the flip-flop circuit 133 is reset. Sensible means such as a pin 134 are located either on the sequentially first slides or on the tray 12 at the locations of the sequentially first slides. The motor enabling voltage provided on the line 132 causes the motor 84 to cause the tray 12 to be stepped continuously in a reverse direction. When the arm 136 (FIG. 1) on the assembly of the switch 128 senses such a pin 134 indicating a sequentially first slide, switch 128 is opened and the accessing switching circuit is thereby enabled to cause the motor 84 to stop by removing the motor enabling voltage from the line 132. Also, upon the opening of the switch 128, the flip-flop circuit 125 is reset; and the flip-flop circuit 133 is set to cause a signal to be delivered on the line 138 to energize the slide positioning relay coil 58 thereby causing a sequentially first slide 14 to be raised from the tray 12.

To remove the tray 12 from the apparatus 10, the "tray-out" switch 140 must be held down. While the switch 140 is held down, switch contacts 140a and 140b are closed.

The closure of the switch contact 140a causes a signal to be delivered on line 142 to energize the slide positioning relay coil 58 to cause the slide 14 to be lowered into the tray 12; and also causes a signal to be delivered on the line 144 thereby causing the stepping motor 84 to step the tray 12 in the reverse direction and out of the apparatus 10. The closure of switch contacts 140b maintains the flip-flop circuit 133 in a "reset" state thereby making the relay coil 58 impervious to any signals which are received on line 108 which would otherwise energize the relay coil 58 and thus cause the attempted raising of a slide 14 while the tray 12 is being stepped.

Figures 4, 4A:
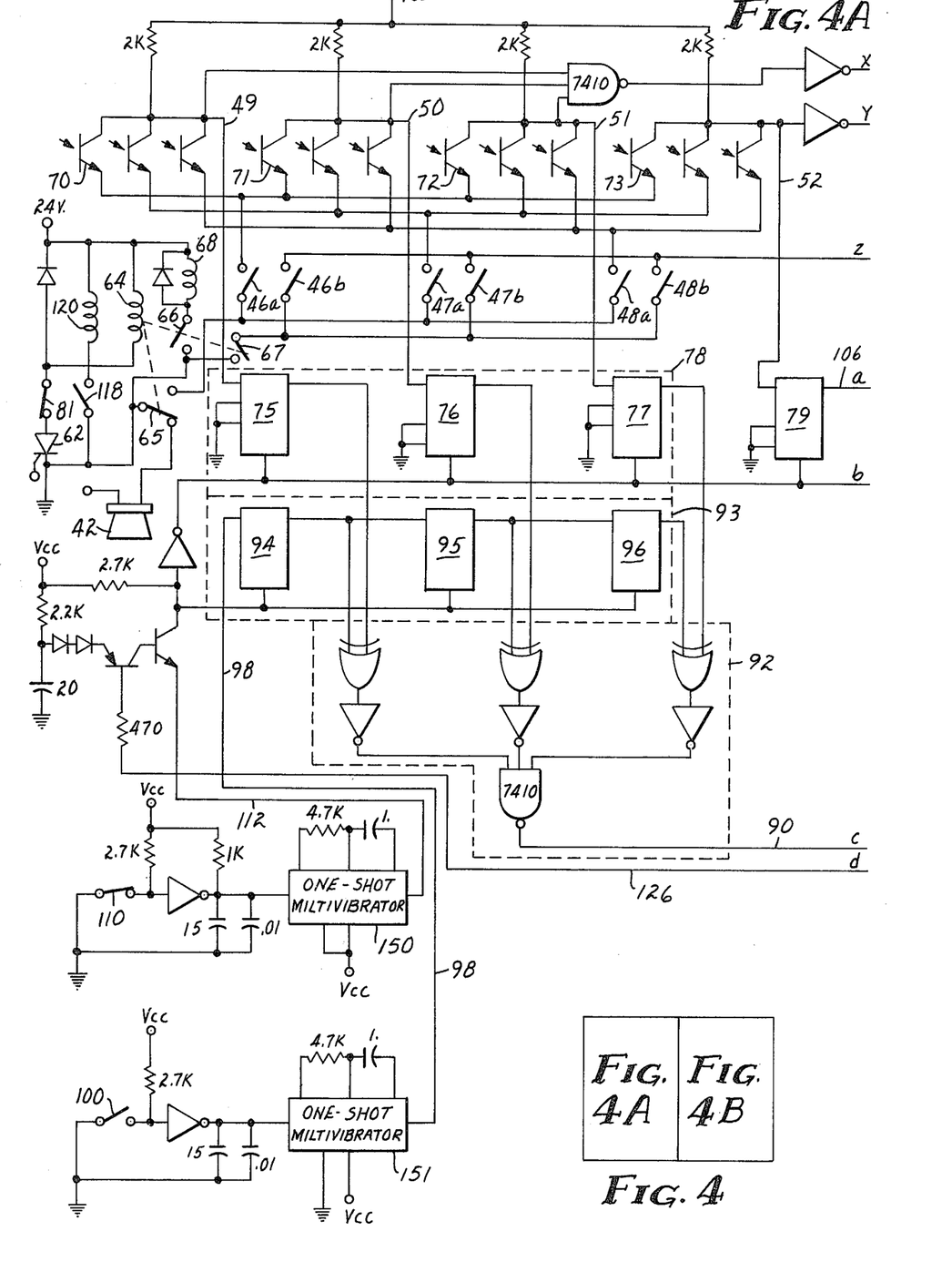
FIGS. 4A and 4B, when combined as shown in FIG. 4, is a schematic diagram of the electrical circuit used in the system shown in FIG. 1.
Figure 4B:
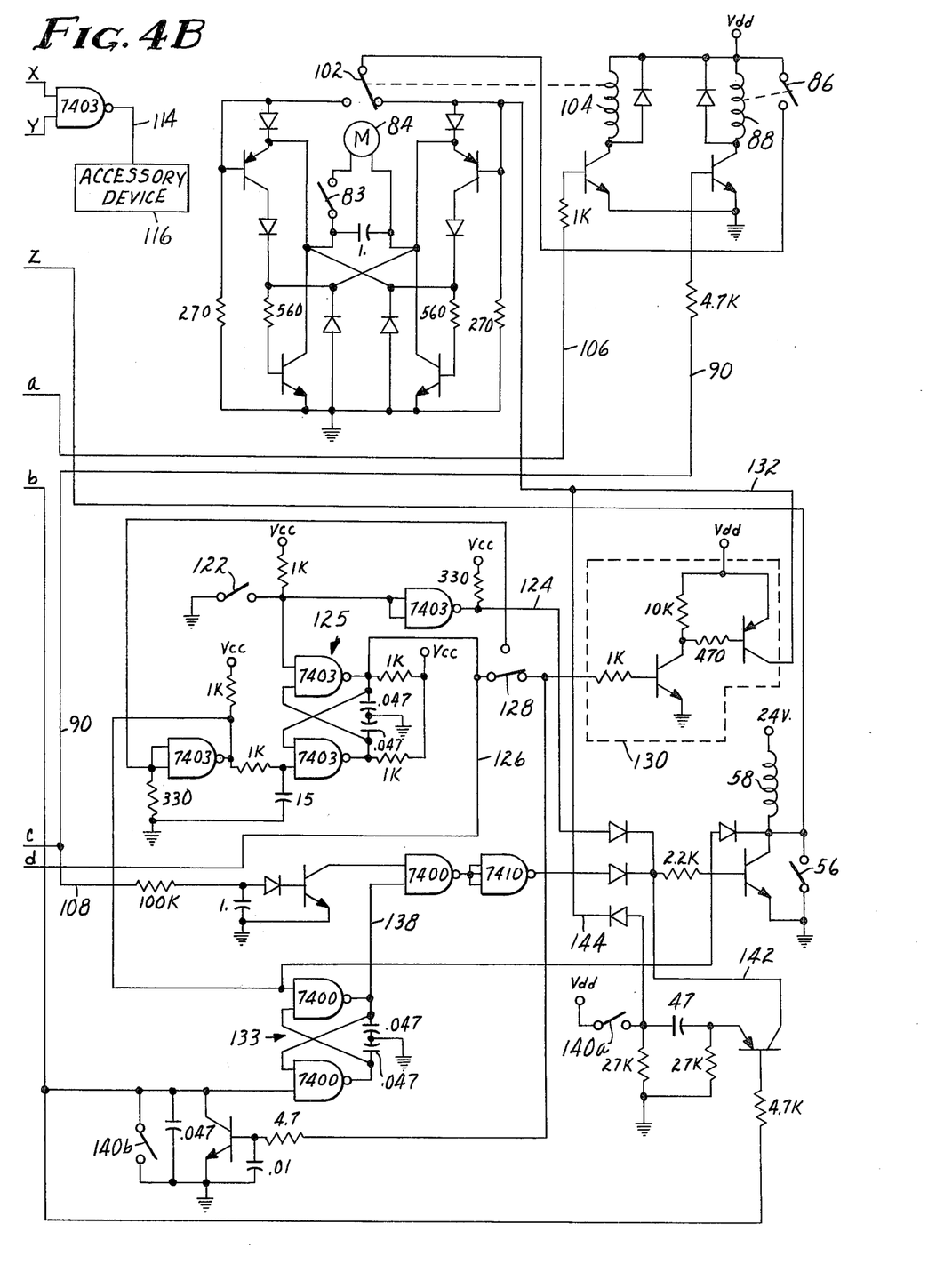

The phototransistors used in the preferred embodiment of the circuit shown in FIGS. 4A and 4B are all Component No. FPT120, available from Fairchild Semiconductor of Mountainview, California, U.S.A. The one-shot multivibrators 150 and 151 are Component No. 74121 available from Texas Instruments, Incorporated of Dallas, Texas, U.S.A.

All of the various logic elements are TTL 7400 series components. The component numbers of the various types of NAND gates are shown in FIGS. 4A and 4B. All of the inverters are component No. 7405. Flip-flops 94, 95 and 96 are internally coupled in a four-bit counter, Component No. 7493. The exclusiveor elements are all contained in a Component No. 7486. The flip-flops 75, 76, 77 and 79 are all Component No. 7479.

The DC voltage bias sources $v_{cc}$ are all 5 volts. The DC voltage bias sources $V_{dd}$ are both adjustable between 3½ and 12 volts.

The values of the resistors in ohms and the values of the capacitors in microfarads are shown on the circuit diagram.

What is claimed is:

1. An audio-visual system wherein a plurality of audio-visual slides having correlated recorded audio and visual information and being removably located in a magazine are transported by positioning means within an audio-visual slide apparatus to present a given one of the audio-visual slides for providing correlated reproduced audio and projected visual information from said presented audio-visual slide, wherein the audio-visual slides are located in a sequence corresponding to a branched learning format and each slide contains a given number of predetermined response choices related to said correlated audio and visual information, and a given number of projectable predetermined programs, each program individually relating a said response choice to a predetermined audio-visual slide having a predetermined location in said sequence;

wherein the audio-visual slide apparatus comprises
    selection means for enabling an operator to select one of said given number of predetermined response choices,
    projection means for projecting said given number of predetermined programs from said audio-visual slide, sensing means responsive to the operation of the selection means for sensing the one of said projected predetermined programs which is related to said selected response choice, and control means responsive to the operation of the selection means for controlling the positioning means in accordance with said sensed predetermined program to present said predetermined audio-visual slide related to said selected predetermined response choice;

wherein each of the projectable predetermined programs of a given audio-visual slide includes first indicia providing a binary number for indicating the number of audio-visual slides in said sequence that said predetermined audio-visual slide related to said predetermined response choice by said program is located in the sequence from the given audio-visual slide; and wherein the positioning means includes a stepping means for incrementally stepping the magazine a number of steps corresponding to said number of audio-visual slides in said sequence that said predetermined audio-visual slide is located in the sequence from the presented given audio-visual slide, characterized by the control means comprising counting means for counting the number of steps stepped by the stepping means; and a registering means for registering the binary number provided by the first indicia of said sensed predetermined programs; and comparing and gating means for comparing the counted number of steps with the registered binary number and for enabling the stepping means to repetitively incrementally step until the number of steps counted by the counting means equals the registered binary number.

2. An audio-visual system wherein a plurality of audio-visual slides having correlated recorded audio and visual information and being removably located in a magazine are transported by positioning means within an audio-visual slide apparatus to present a given one of the audio-visual slides for providing correlated reproduced audio and projected visual information from said presented audio-visual slide, wherein the audio-visual slides are located in a sequence corresponding to a branched learning format and each slide contains a given number of predetermined response choices related to said correlated audio and visual information, and a given number of projectable predetermined programs, each program individually relating a said response choice to a predetermined audio-visual slide having a predetermined location in said sequence;

wherein the audio-visual slide apparatus comprises selection means for enabling an operator to select one of said given number of predetermined response choices, projection means for projecting said given number of predetermined programs from said audio-visual slide, sensing means responsive to the operation of the selection means for sensing the one of said projected predetermined programs which is related to said selected response choice, and control means responsive to the operation of the selection means for controlling the positioning means in accordance with said sensed predetermined program to present said predetermined audio-visual slide related to said selected predetermined response choice;

wherein each of the projectable predetermined programs of a given audio-visual slide includes first indicia providing a binary number for indicating the number of audio-visual slides in said sequence that said predetermined audio-visual slide related to said predetermined response choice by said program is located in the sequence from the given audio-visual slide; and wherein the positioning means includes a stepping means for incrementally stepping the magazine a number of steps corresponding to said number of audio-visual slides in said sequence that said predetermined audio-visual slide is located in the sequence from the presented given audio-visual slide, wherein the stepping means are bidirectional; wherein each of the projectable predetermined programs of a given audio-visual slide further includes second indicia for indicating the direction in the sequence of audio-visual slides that said predetermined audio-visual slide related to said predetermined response choice by said program is located in the sequence from the given audio-visual slide; and wherein the bidirectional stepping means are responsive to said sensed second indicia for stepping the magazine in the indicated direction, characterized by the control means further comprising a direction setting switching means for setting the stepping means in accordance with the second indicia of said sensed predetermined program to step the magazine in either a forward or a reverse direction corresponding to forward and reverse directions in the sequence of audio-visual slides.

3. An audio-visual system wherein a plurality of audio-visual slides having correlated recorded audio and visual information and being removably located in a magazine are transported by positioning means within an audio-visual slide apparatus to present a given one of the audio-visual slides for providing correlated reproduced audio and projected visual information from said presented audio-visual slide, wherein the audio-visual slides are located in a sequence corresponding to a branched learning format and each slide contains a given number of predetermined response choices related to said correlated audio and visual information, and a given number of projectable predetermined programs, each program individually relating a said response choice to a predetermined audio-visual slide having a predetermined location in said sequence;

wherein the audio-visual slide apparatus comprises selection means for enabling an operator to select one of said given number of predetermined response choices, projection means for projecting said given number of predetermined programs from said audio-visual slide, sensing means responsive to the operation of the selection means for sensing the one of said projected predetermined programs which is related to said selected response choice, and control means responsive to the operation of the selection means for controlling the positioning means in accordance with said sensed predetermined program to present said predetermined audio-visual slide related to said selected predetermined response choice;

wherein each of the projectable predetermined programs of a given audio-visual slide includes first indicia providing a binary number for indicating the number of audio-visual slides in said sequence that said predetermined audio-visual slide related to said predetermined response choice by said program is located in the sequence from the given audio-visual slide; and wherein the positioning means includes a stepping means for incrementally stepping the magazine a number of steps corresponding to said number of audio-visual slides in said sequence that said predetermined audio-visual slide is located in the sequence from the presented given audio-visual slide, characterized by the control means including means for causing the audio information from a presented audio-visual slide to be repeated when said sensed first indicia indicate that the stepping means should step zero steps.

4. An audio-visual system wherein a plurality of audio-visual slides having correlated recorded audio and visual information and being removably located in a magazine are transported by positioning means within an audio-visual slide apparatus to present a given one of the audio-visual slides for providing correlated reproduced audio and projected visual information from said presented audio-visual slide, wherein the audio-visual slides are located in a sequence corresponding to a branched learning format and each slide contains a given number of predetermined response choices related to said correlated audio and visual information, and a given number of projectable predetermined programs, each program individually relating a said response choice to a predetermined audio-visual slide having a predetermined location in said sequence;

wherein the audio-visual slide apparatus comprises selection means for enabling an operator to select one of said given number of predetermined response choices, projection means for projecting said given number of predetermined programs from said audio-visual slide, sensing means responsive to the operation of the selection means for sensing the one of said projected predetermined programs which is related to said selected response choice, and control means responsive to the operation of the selection means for controlling the positioning means in accordance with said sensed predetermined program to present said predetermined audio-visual slide related to said selected predetermined response choice;

wherein each of the projectable predetermined programs of a given audio-visual slide includes first indicia providing a binary number for indicating the number of audio-visual slides in said sequence that said predetermined audio-visual slide related to said predetermined response choice by said program is located in the sequence from the given audio-visual slide; and wherein the positioning means includes a stepping means for incrementally stepping the magazine a number of steps corresponding to said number of audio-visual slides in said sequence that said predetermined audio-visual slide is located in the sequence from the presented given audio-visual slide, characterized by the control means including means for causing an accessory device to be actuated when said sensed first indicia indicate that the stepping means should step zero steps.

5. An audio-visual system wherein a plurality of audio-visual slides having correlated recorded audio and visual information and being removably located in a magazine are transported by positioning means within an audio-visual slide apparatus to present a given one of the audio-visual slides for providing correlated reproduced audio and projected visual information from said presented audio-visual slide, wherein the audio--visual slides are located in a sequence corresponding to a branched learning format and each slide contains a given number of predetermined response choices related to said correlated audio and visual information, and a given number of projectable predetermined programs, each program individually relating a said response choice to a predetermined audio-visual slide having a predetermined location in said sequence;

wherein the audio-visual slide apparatus comprises selection means for enabling an operator to select one of said given number of predetermined response choices, projection means for projecting said given number of predetermined programs from said audio-visual slide, sensing means responsive to the operation of the selection means for sensing the one of said projected predetermined programs which is related to said selected response choice, and control means responsive to the operation of the selection means for controlling the positioning means in accordance with said sensed predetermined program to present said predetermined audio-visual slide related to said selected predetermined response choice;

wherein each of the projectable predetermined programs of a given audio-visual slide includes first indicia providing a binary number for indicating the number of audio-visual slides in said sequence that said predetermined audio-visual slide related to said predetermined response choice by said program is located in the sequence from the given audio-visual slide; and wherein the positioning means includes a stepping means for incrementally stepping the magazine a number of steps corresponding to said number of audio-visual slides in said sequence that said predetermined audio-visual slide is located in the sequence from the presented given audio-visual slide, wherein the stepping means are bidirectional; and wherein each of the projectable predetermined programs of a given audio-visual slide further includes second indicia for indicating the direction in the sequence of audio-visual slides that said predetermined audio-visual slide related to said predetermined response choice by said program is located in the sequence from the given audio-visual slide; and wherein the bidirectional stepping means are responsive to said sensed second indicia for stepping the magazine in the indicated direction.
  characterized by the control means including means for causing the audio information from a presented audio-visual slide to be repeated when said sensed first indicia indicate that the stepping means should step zero steps in one given direction and by the control means further including means for causing an accessory device to be actuated when said sensed first indicia indicate that the stepping means should step zero steps in the opposite direction.

6. An audio-visual system wherein a plurality of audio-visual slides having correlated recorded audio and visual information and being removably located in a magazine are transported by positioning means within an audio-visual slide apparatus to present a given one of the audio-visual slides for providing correlated reproduced audio and projected visual information from said presented audio-visual slide,
  wherein the audio-visual slides being located in a sequence corresponding to a branched learning format and each contains
    a given number of predetermined response choices related to said correlated audio and visual information, and
    a given number of projectable predetermined programs, each program individually relating a said response choice to a predetermined audio-visual slide having a predetermined location in said sequence;
  wherein the audio-visual slide apparatus comprises
    selection means for enabling an operator to select one of said given number of predetermined response choices,
    projection means for projecting said given number of predetermined programs from said audio-visual slide,
    sensing means responsive to the operation of the selection means for sensing the one of said projected predetermined programs which is related to said selected response choice, and
    control means responsive to the operation of the selection means for controlling the positioning means in accordance with said sensed predetermined program to present said predetermined audio-visual slide related to said selected predetermined response choice;
  wherein each of a plurality of groups of adjacent audio-visual slides contains related information, with one audio-visual slide in each group being the sequentially first audio-visual slide for that group;
  wherein either the locations of each such first audio-visual slide in the magazine or the individual first slides themselves, comprise
    sensible means for indicating that such audio-visual slide is a first audio-visual slide; and
  wherein the audio-visual slide apparatus further comprises
    an operator-actuatable first audio-visual slide accessing means for causing the positioning means to reposition the magazine until a first audio-visual slide is detected in such position as to be removed from the magazine and presented for providing audio and visual information therefrom, which accessing means include
      detector switching means positioned for detecting said sensible means, and
      an access switching means enabled by the detector switching means for causing the positioning means to stop repositioning the magazine when a said sequentially first audio-visual slide is detected at such position.

7. An audio-visual slide apparatus for providing correlated reproduced audio and projected visual information from a given presented audio-visual slide of a plurality of audio-visual slides having correlated recorded audio and visual information and being removably located in a magazine, wherein said audio-visual slides are positioned by positioning means to present said given one of the audio-visual slides, and wherein the slide apparatus is adapted for presenting audio-visual slides which are located in a sequence corresponding to a branched learning format wherein each audio-visual slide contains a given number of predetermined response choices related to said correlated audio and visual information, and a given number of projectable predetermined programs, each program individually relating to said response choice to a predetermined audio-visual slide having a predetermined location in said sequence,
  the audio-visual slide apparatus comprising
    selection means for enabling an operator to select one of said given number of predetermined response choices,
    projection means for projecting said given number of predetermined programs from said audio-visual slide,
    sensing means responsive to the operation of the selection means for sensing the one of said projected predetermined programs which is related to said selected response choice, and
    control means responsive to the operation of the selection means for controlling the positioning means in accordance with said sensed predetermined program to present said predetermined audio-visual slide related to said selected predetermined response choice;
  wherein the slide apparatus is adapted for presenting given audio-visual slides wherein each of the projectable predetermined programs include first indicia providing a binary number for indicating the number of audio-visual slides in said sequence that said predetermined audio-visual slide related to said predetermined response choice by said program is located in the sequence from the given audio-visual slide;
  wherein the positioning means includes a stepping means for stepping the magazine a number of steps corresponding to said number of audio-visual slides in said sequence that said predetermined audio-visual slide is located in the sequence from the presented given audio-visual slide; and
  wherein the control means comprise
    counting means for counting the number of steps stepped by the stepping means; and
    a registering means for registering the binary number provided by the first indicia of said sensed predetermined program; and comparing and gating means for comparing the counted number of steps with the registered binary number and for enabling the stepping means to repetitively incrementally step until the number of steps counted by the counting means equals the registered binary number.

8. An audio-visual slide apparatus according to claim 7 wherein the stepping means are bidirectional, characterized by being adapted for presenting audio-visual slides, wherein each of the projectable predetermined programs further includes second indicia for indicating the direction in the sequences of audio-visual slides that said predetermined audio-visual slide related to said predetermined response choice by said program is located in the sequence from the given audio-visual slide; wherein the bidirectional stepping means are responsive to the sensed second indicia for stepping the magazine in the indicated direction.

9. An audio-visual slide apparatus according to claim 8, characterized by the control means further comprising a direction setting switching means for setting the stepping means in accordance with the second indicia of said sensed predetermined program to step the magazine in either a forward or a reverse direction corresponding to forward and reverse directions in the sequence of audio-visual slides.

10. An audio-visual slide apparatus according to claim 7 characterized by the control means including means for causing the audio information from a presented audio-visual slide to be repeated when said sensed first indicia indicate that the stepping means should step zero steps.

11. An audio-visual slide apparatus according to claim 7, characterized by being adapted for presenting audio-visual slides wherein the given number of predetermined response choices are included in a discrete section of the slide portion of each audio-visual slide; and by the audio-visual slide apparatus further comprising
a shutter supported for either blocking the display of an image of said response choices or enabling the display of an image of said response choices.

12. An audio-visual slide apparatus for providing correlated reproduced audio and projected visual information from a given presented audio-visual slide of a plurality of audio-visual slides having correlated recorded audio and visual information and being removably located in a magazine, wherein said audio-visual slides are positioned by positioning means to present said given one of the audio-visual slides, and wherein the slide apparatus is adapted for presenting audio-visual slides which are located in a sequence corresponding to a branched learning format wherein each audio-visual slide contains a given number of predetermined response choices related to said correlated audio and visual information, and a given number of projectable predetermined programs, each program individually relating a said response choice to a predetermined audio-visual slide having a predetermined location in said sequence, the audio-visual slide apparatus comprising
selection means for enabling an operator to select one of said given number of predetermined response choices,
projection means for projecting said given number of predetermined programs from said audio-visual slide,
sensing means responsive to the operation of the selection means for sensing the one of said projected predetermined programs which is related to said selected response choice, and
control means responsive to the operation of the selection means for controlling the positioning means in accordance with said sensed predetermined program to present said predetermined audio-visual slide related to said selected predetermined response choice;

wherein each of a plurality of groups of adjacent audio-visual slides contains related information, with one audio-visual slide in each group being the sequentially first audio-visual slide for that group; and wherein the audio-visual slide apparatus further comprises an operator-actuatable first audio-visual slide accessing means for causing the positioning means to reposition the magazine until a first audio-visual slide is detected in such position as to be removed from the magazine and presented for providing audio and visual information therefrom, which accessing means include detector switching means positioned for detecting sensible means on either such first audio-visual slides or on a said magazine at the locations of such first audio-visual slides, and an access switching means enabled by the detector switching means for causing the positioning means to stop repositioning the magazine when a said sequentially first audio-visual slide is detected at such position.

13. An audio-visual system wherein audio-visual media having a plurality of correlated recorded audio and visual information presentations are transported by positioning means within an audio-visual apparatus to present a given one of the correlated audio-visual presentations, wherein the correlated audio-visual presentations are located in a sequence corresponding to a branched learning format and each presentation contains a given number of predetermined response choices related to said correlated audio and visual information, and, a given number of projectable predetermined programs, each program individually relating a said response choice to a predetermined correlated audio-visual presentation having a predetermined location in said sequence;

wherein the audio-visual presentation apparatus comprises selection means for enabling an operator to select one of said given number of predetermined response choices, projection means for projecting said given number of predetermined programs from the presented correlated audio-visual presentation, sensing means responsive to the operation of the selection means for sensing the one of said projected predetermined programs which is related to said selected response choice, and control means responsive to the operation of the selection means for controlling the positioning means in accordance with said sensed predetermined program to present said predetermined correlated audio-visual presentation related to said selected predetermined response choice;

wherein each of the projectable predetermined programs of a given correlated audio-visual presentation includes first indicia providing a binary number for indicating the number of correlated audio-visual presentations in said sequence that said predetermined correlated audio-visual presentation related to said predetermined response choice by said program is located in the sequence from the given correlated audio-visual presentation;

wherein the positioning means include stepping means for incrementally repositioning the audio-visual media a number of steps corresponding to said number of correlated audio-visual presentations in said sequence that said predetermined correlated audio-visual presentation is located in the sequence from the presented given correlated audio-visual presentation;

wherein each of the projectable predetermined programs of a given correlated audio-visual presentation further includes second indicia for indicating the direction in the sequence of correlated audio-visual presentations that said predetermined correlated audio-visual presentations related to said predetermined response choice by said program is located in the sequence from the given correlated audio-visual presentation; and wherein the positioning means are responsive to said sensed second indicia for stepping the audio-visual media in the indicated direction, characterized by the control means comprising counting means for counting the number of steps stepped by the stepping means; and a registering means for registering a count in accordance with the binary number provided by the first indicia of said sensed predetermined program; and comparing and gating means for comparing the counted number of steps with the registered binary number and for enabling the stepping means to repetitively incrementally step until the number of steps counted by the counting means equals the registered binary number.

14. An audio-visual system wherein audio-visual media having a plurality of correlated recorded audio and visual information presentations are transported by positioning means within an audio-visual apparatus to present a given one of the correlated audio-visual presentations, wherein the correlated audio-visual presentations are located in a sequence corresponding to a branched learning format and each presentation contains a given number of predetermined response choices related to said correlated audio and visual information, and a given number of projectable predetermined programs, each program individually relating a said response choice to a predetermined correlated audio-visual presentation having a predetermined location in said response;

wherein the audio-visual presentation apparatus comprises selection means for enabling an operator to select one of said given number of predetermined response choices, projection means for projecting said given number of predetermined programs from the presented correlated audio-visual presentation, sensing means responsive to the operation of the selection means for sensing the one of said projected predetermined programs which is related to said selected response choice, and control means responsive to the operation of the selection means for controlling the positioning means in accordance with said sensed predetermined program to present said predetermined correlated audio-visual presentation related to said selected predetermined response choice;

wherein each of the projectable predetermined programs of a given correlated audio-visual presentation includes first indicia providing a binary number for indicating the number of correlated audio-visual presentations in said sequence that said predetermined correlated audio-visual presentation related to said predetermined response choice by said program is located in the sequence from the given correlated audio-visual presentation;

wherein the positioning means include stepping means for incrementally repositioning the audio-visual media a number of steps corresponding to said number of correlated audio-visual presentations in said sequence that said predetermined correlated audio-visual presentation is located in the sequence from the presented given correlated audio-visual presentation;

wherein each of the projectable predetermined programs of a given correlated audio-visual presentation further includes second indicia for indicating the direction in the sequence of correlated audio-visual presentations that said predetermined correlated audio-visual presentations related to said predetermined response choice by said program is located in the sequence from the given correlated audio-visual presentation; and wherein the positioning means are responsive to said sensed second indicia for stepping the audio-visual media in the indicated direction characterized by the control means further comprising a direction setting switching means for setting the stepping means in accordance with the second indicia of said sensed predetermined program to step the audio-visual media in either a forward or a reverse direction corresponding to forward and reverse directions in the sequence of correlated audio-visual presentations.

15. An audio-visual system wherein audio-visual media having a plurality of correlated recorded audio and visual information presentations are transported by positioning means within an audio-visual apparatus to present a given one of the correlated audio-visual presentations, wherein the correlated audio-visual presentations are located in a sequence corresponding to a branched learning format and each presentation contains a given number of predetermined response choices related to said correlated audio and visual information, and a given number of projectable predetermined programs, each program individually relating a said response choice to a predetermined correlated audio-visual presentation having a predetermined location in said sequence;
wherein the audio-visual presentation apparatus comprises
selection means for enabling an operator to select one of said given number of predetermined response choices,
projection means for projecting said given number of predetermined programs from the presented correlated audio-visual presentation,
sensing means responsive to the operation of the selection means for sensing the one of said projected predetermined programs which is related to said selected response choice, and
control means responsive to the operation of the selection means for controlling the positioning means in accordance with said sensed predetermined program to present said predetermined correlated audio-visual presentation related to said selected predetermined response choice;
wherein each of the projectable predetermined programs of a given correlated audio-visual presentation includes
first indicia providing a binary number for indicating the number of correlated audio-visual presentations in said sequence that said predetermined correlated audio-visual presentation related to said predetermined response choice by said program is located in the sequence from the given correlated audio-visual presentation;
wherein the positioning means include stepping means for incrementally repositioning the audio-visual media a number of steps corresponding to said number of correlated audio-visual presentations in said sequence that said predetermined correlated audio-visual presentation is located in the sequence from the presented given correlated audio-visual presentation;
wherein each of the projectable predetermined programs of a given correlated audio-visual presentation further includes
second indicia for indicating the direction in the sequence of correlated audio-visual presentations that said predetermined correlated audio-visual presentations related to said predetermined response choice by said program is located in the sequence from the given correlated audio-visual presentation; and
wherein the positioning means are responsive to said sensed second indicia for stepping the audio-visual media in the indicated direction,
characterized by the control means including means for causing the audio information from a presented correlated audio-visual presentation to be repeated when said sensed first indicia indicate that the stepping means should step zero steps.

16. An audio-visual system wherein audio-visual media having a plurality of correlated recorded audio and visual information presentations are transported by positioning means within an audio-visual apparatus to present a given one of the correlated audio-visual presentations,
wherein the correlated audio-visual presentations are located in a sequence corresponding to a branched learning format and each presentation contains
a given number of predetermined response choices related to said correlated audio and visual information, and a given number of projectable predetermined programs, each program individually relating a said response choice to a predetermined correlated audio-visual presentation having a predetermined location in said sequence;
wherein the audio-visual presentation apparatus comprises
selection means for enabling an operator to select one of said given number of predetermined response choices,
projection means for projecting said given number of predetermined programs from the presented correlated audio-visual presentation,
sensing means responsive to the operation of the selection means for sensing the one of said projected predetermined programs which is related to said selected response choice, and
control means responsive to the operation of the selection means for controlling the positioning means in accordance with said sensed predetermined program to present said predetermined correlated audio-visual presentation related to said selected predetermined response choice;
wherein each of the projectable predetermined programs of a given correlated audio-visual presentation includes
first indicia providing a binary number for indicating the number of correlated audio-visual presentations in said sequence that said predetermined correlated audio-visual presentation related to said predetermined response choice by said program is located in the sequence from the given correlated audio-visual presentation;
wherein the positioning means include stepping means for incrementally repositioning the audio-visual media a number of steps corresponding to said number of correlated audio-visual presentations in said sequence that said predetermined correlated audio-visual presentation is located in the sequence from the presented given correlated audio-visual presentation;
wherein each of the projectable predetermined programs of a given correlated audio-visual presentation further includes
second indicia for indicating the direction in the sequence of correlated audio-visual presentations that said predetermined correlated audio-visual presentations related to said predetermined response choice by said program is located in the sequence from the given correlated audio-visual presentation; and
wherein the positioning means are responsive to said sensed second indicia for stepping the audio-visual media in the indicated direction,
characterized by the control means including means for causing an accessory device to be actuated when said sensed first indicia indicate that the stepping means should step zero steps.

17. An audio-visual system wherein audio-visual media having a plurality of correlated recorded audio and visual information presentations are transported by positioning means within an audio-visual apparatus to present a given one of the correlated audio-visual presentations,
wherein the correlated audio-visual presentations are located in a sequence corresponding to a branched learning format and each presentation contains a given number of predetermined response choices related to said correlated audio and visual information, and a given number of projectable predetermined programs, each program individually relating a said response choice to a predetermined correlated audio-visual presentation having a predetermined location in said sequence;

wherein the audio-visual presentation apparatus comprises selection means for enabling an operator to select one of said given number of predetermined response choices, projection means for projecting said given number of predetermined programs from the presented correlated audio-visual presentation, sensing means responsive to the operation of the selection means for sensing the one of said projected predetermined programs which is related to said selected response choice, and control means responsive to the operation of the selection means for controlling the positioning means in accordance with said sensed predetermined program to present said predetermined correlated audio-visual presentation related to said selected predetermined response choice;

wherein each of the projectable predetermined programs of a given correlated audio-visual presentation includes first indicia providing a binary number for indicating the number of correlated audio-visual presentations in said sequence that said predetermined correlated audio-visual presentation related to said predetermined response choice by said program is located in the sequence from the given correlated audio-visual presentation;

wherein the positioning means include stepping means for incrementally repositioning the audio-visual media a number of steps corresponding to said number of correlated audio-visual presentations in said sequence that said predetermined correlated audio-visual presentation is located in the sequence from the presented given correlated audio-visual presentation;

wherein each of the projectable predetermined programs of a given correlated audio-visual presentation further includes second indicia for indicating the direction in the sequence of correlated audio-visual presentations that said predetermined correlated audio-visual presentations related to said predetermined response choice by said program is located in the sequence from the given correlated audio-visual presentation; and wherein the positioning means are responsive to said sensed second indicia for stepping the audio-visual media in the indicated direction, characterized by the control means including means for causing the audio information from a presented audio-visual slide to be repeated when said sensed first and second indicia indicate that the stepping means should step zero steps in one given direction and by the control means further including means for causing an accessory device to be actuated when said sensed first and second indicia indicate that the stepping means should step zero steps in the opposite direction.

* * * * *